(12) United States Patent
Noritake et al.

(10) Patent No.: US 6,686,981 B2
(45) Date of Patent: *Feb. 3, 2004

(54) REFLECTION TYPE LIQUID CRYSTAL DISPLAY

(75) Inventors: Kazuto Noritake, Gifu (JP); Shinji Ogawa, Ohgaki (JP)

(73) Assignee: Sanyo Electric Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/397,976

(22) Filed: Sep. 16, 1999

(65) Prior Publication Data

US 2001/0046013 A1 Nov. 29, 2001

(51) Int. Cl.[7] .............................................. G02F 1/133
(52) U.S. Cl. ...................................... 349/113; 349/129
(58) Field of Search ................................ 349/113, 129, 349/112

(56) References Cited

U.S. PATENT DOCUMENTS

| | | | | |
|---|---|---|---|---|
| 5,309,264 A | * | 5/1994 | Lien et al. | 349/143 |
| 5,548,425 A | * | 8/1996 | Adachi et al. | 349/69 |
| 5,691,791 A | * | 11/1997 | Nakamura et al. | 349/113 |
| 5,796,455 A | * | 8/1998 | Mizobata et al. | 349/113 |
| 5,805,252 A | * | 9/1998 | Shimada et al. | 349/113 |
| 5,847,789 A | * | 12/1998 | Nakamura et al. | 349/113 |
| 5,907,380 A | * | 5/1999 | Lien | 349/141 |
| 5,963,284 A | * | 10/1999 | Jones et al. | 349/112 |
| 5,995,180 A | * | 11/1999 | Moriwaki et al. | 349/113 |
| 6,097,466 A | * | 8/2000 | Koma | 349/143 |
| 6,115,100 A | * | 9/2000 | Koma | 349/181 |
| 6,137,558 A | * | 10/2000 | Koma et al. | 349/143 |

FOREIGN PATENT DOCUMENTS

| | | | |
|---|---|---|---|
| JP | 06-258649 | * | 9/1994 |
| JP | 08-002-23 | * | 1/1996 |

OTHER PUBLICATIONS

Ogawa et al, "The Trends of Reflective LCDs for Future Electronic Paper", SID May 1998.*
Lien et al., "Ridge and Fringe–Field Multi–Domain Homeotropic LCD", SID'May 1998.*
Lien et al., "Ridge and Fring–Field Multi–Domain Homeotropic LCD", Proceedings of SID, May 1998.*

* cited by examiner

Primary Examiner—Kenneth Parker
(74) Attorney, Agent, or Firm—Cantor Colburn LLP

(57) ABSTRACT

A reflection type liquid crystal display comprises first and second substrates disposed facing each other and holding a liquid crystal exhibiting a negative dielectric constant anisotropy between them, the first substrate (10) has on the side of its surface facing the second substrate a TFT as a switching element, a reflective display electrode (50) formed of a conductive reflective material and connected to the TFT and a vertical alignment film for vertically aligning the liquid crystal molecules. The second substrate (30) has on the side facing the first substrate a counter electrode (33) including an alignment control window (36) for controlling the alignment of the liquid crystal molecules and an alignment film. The second substrate (30) has on the viewing side of the display, the side of its surface not facing the first substrate, a phase plate (44) and a polarizer (45) forms. A light diffusing layer is formed on the side of the second substrate facing or not facing the first substrate. With this configuration, the display device when viewed from the viewing side is free of the occurrence of parallax and provides a wide viewing angle.

13 Claims, 4 Drawing Sheets

REFLECTION TYPE LIQUID CRYSTAL DISPLAY

BACKGROUND OF THE INVENTION

1. Field of the Invention

The present invention relates to a reflection type liquid crystal display.

2. Description of the Prior Art

A number of reflection type liquid crystal displays that create a recognizable image by reflecting incident light originating from the observer's side have been proposed.

FIG. 1 is a sectional view of a conventional reflection type liquid crystal display.

As shown in FIG. 1, such a conventional reflection type liquid crystal display includes gate electrodes 11 made of a refractory metal, such as chromium (Cr) or molybdenum (Mo), a gate insulating film 12, and active layers 13 made of polysilicon formed successively on an insulating substrate of quartz glass or non-alkali glass or the like.

Each active layer 13 includes channels 13c formed above the gate electrodes 11, and a source 13s and a drain 13d that are formed on both sides of the channels 13c by ion implantation using stopper insulating films 14 on the channels 13c as masks.

An inter-layer insulating film 15, which includes a $SiO_2$ film, a SiN film and a $SiO_2$ film deposited in succession, is formed over the entire surfaces of the gate insulating film 12, the active layer 13 and the stopper insulating films 14. A drain electrode 16 is formed by filling a contact hole, which is formed to correspond to the drain 13d, with a metal, such as Al. Then, a planarization insulating film 17, which consists of an organic resin, for example and serves to flatten the surface, is formed over the entire surface. A contact hole is formed at a location of the planarization insulating film corresponding to the source 13s. A display electrode 19 as a transparent electrode, which consists of ITO (Indium Thin Oxide) in contact with the source 13s through this contact hole and serves also as the source electrode 18, is formed on the planarization insulating film 17. An alignment film 20 consisting of an organic resin, such as polyimide, and aligns liquid crystal elements 21, is formed on the display electrode 19.

A polarizer 40 and a reflector 42 to reflect incident light are arranged on the surface of an insulating substrate having TFTs fabricated as described (a TFT substrate) 10 which is opposite the surface where there is the TFT.

On the side of a counter electrode substrate 30 facing the TFT substrate 10, are provided a color filter 31 including primary colors, red (R), green (G), and blue (B) and a black matrix 32 with a function to shield light; a protective film 33 of a resin formed on the color filter 31; and a counter electrode 34 and an alignment film 35 formed over the entire surface of the protective film 33. On the side not facing the insulating substrate 10, a polarizer 41 is located. The insulating substrate 10 and the counter electrode substrate 30 are bonded together with their peripheries sealed with a sealing bond, thus forming a space inside, and this space is filled with a twisted nematic (TN) liquid crystal 21 with positive dielectric constant anisotropy.

The propagation of light when a user views reflection type liquid crystal display as above is described below with reference to FIG. 1.

As indicated by a broken line with an arrow, an external light 100, such as natural light, coming from outside enters from the polarizer 40 on the side of an observer 101, and passes through the counter electrode substrate 30, the color filter 31, the protective film 33, the counter electrode 34, the alignment film 35, the TN liquid crystal 21, the alignment film 20 on the TFT substrate 10, the display electrode 19, the planarization insulating film 17, the inter-layer insulating film 15, the gate insulating film 12, the glass substrate 10 and the polarizer 40. The light is reflected by the reflector 42, goes through the layers in a direction opposite to the direction of incidence, emerges from the polarizer 41 of the counter electrode substrate 30 and enters the eyes of the observer.

However, after the incident light 100 passes through the display electrode 19a and is reflected by the reflector 42, the reflected light passes between the display electrode 19a and the display electrode 19b and enters the observer's eyes. More specifically, the fact that the reflected light does not enter to the display electrode 19a gives rise to parallax, and the observer is unable to see an intrinsic image of the display electrode 19a, but rather a disparity. This is a disadvantage.

When a color display is viewed through a color filter as shown in FIG. 1, instead of the proper color of the display electrode, a color disparity due to parallax is viewed.

Another drawback of the conventional reflection type liquid display is that the use of TN liquid crystal results in a very narrow viewing angle for both display and observation.

SUMMARY OF THE INVENTION

The present invention has been made to rectify the disadvantages described above and has as its object to provide a reflection type liquid crystal display that offers display without parallax and a wider angle of view.

According to one aspect of the present invention, there is provided a reflection type liquid crystal display, which comprises first and second substrates disposed facing each other and holding a liquid crystal exhibiting a negative dielectric constant anisotropy therebetween; a switching element, a reflective display electrode formed of a conductive reflective material and connected to the switching element, and an alignment film to align the liquid crystal molecules, disposed on the side of the surface of a first substrate facing the second substrate; a counter electrode having an alignment control window for controlling the alignment of the liquid crystal molecules and an alignment film, disposed on the side of a second substrate facing the first substrate; and a phase plate and a polarizer disposed on the side of the second substrate not facing the first substrate.

According to another aspect of the present invention, the reflection type liquid crystal display comprises first and second substrates disposed facing each other and holding therebetween a liquid crystal exhibiting a negative dielectric constant anisotropy; a switching element, a reflective display electrode formed of a conductive reflective material and connected to the switching element, and an alignment film to align the liquid crystal molecules, disposed on the side of the surface of a first substrate facing the second substrate; a counter electrode having an alignment control window for controlling the alignment of the liquid crystal molecules and an alignment film, disposed on the side of a second substrate facing the first substrate; and a phase plate and a polarizer on the side of the second substrate not facing the first substrate, wherein the side of the second substrate not facing the first substrate is viewing side of the display.

According to yet another aspect of the present invention, a light diffusing layer is formed on either one of the sides of the second substrate which faces or does not face the first substrate.

As mentioned above, according to the present invention, the adoption of the reflective display electrodes more effectively reduces the occurrence of parallax by thickness of glass, for example, than when the reflector was provided on the outer side of the TFT substrate.

By the use of a liquid crystal with a negative dielectric constant anisotropy and by the provision of the alignment control windows, it becomes possible to produce a reflection type display with a wider viewing angle for observation from any direction—from above or below or left or right. The addition of the diffusing layer ensures the diffusion of an incident light into the display device or an emerging light from it, so that a bright screen image can be obtained in any direction.

A polarizer used to be mounted in each substrate, but according to the present invention, only one polarizer is mounted. Therefore, because the attenuation of the incident light can be reduced, a brighter image can be obtained.

DESCRIPTION OF THE PREFERRED EMBODIMENTS

The reflection type liquid crystal display according to the present invention will be described in the following.

Figure 1:
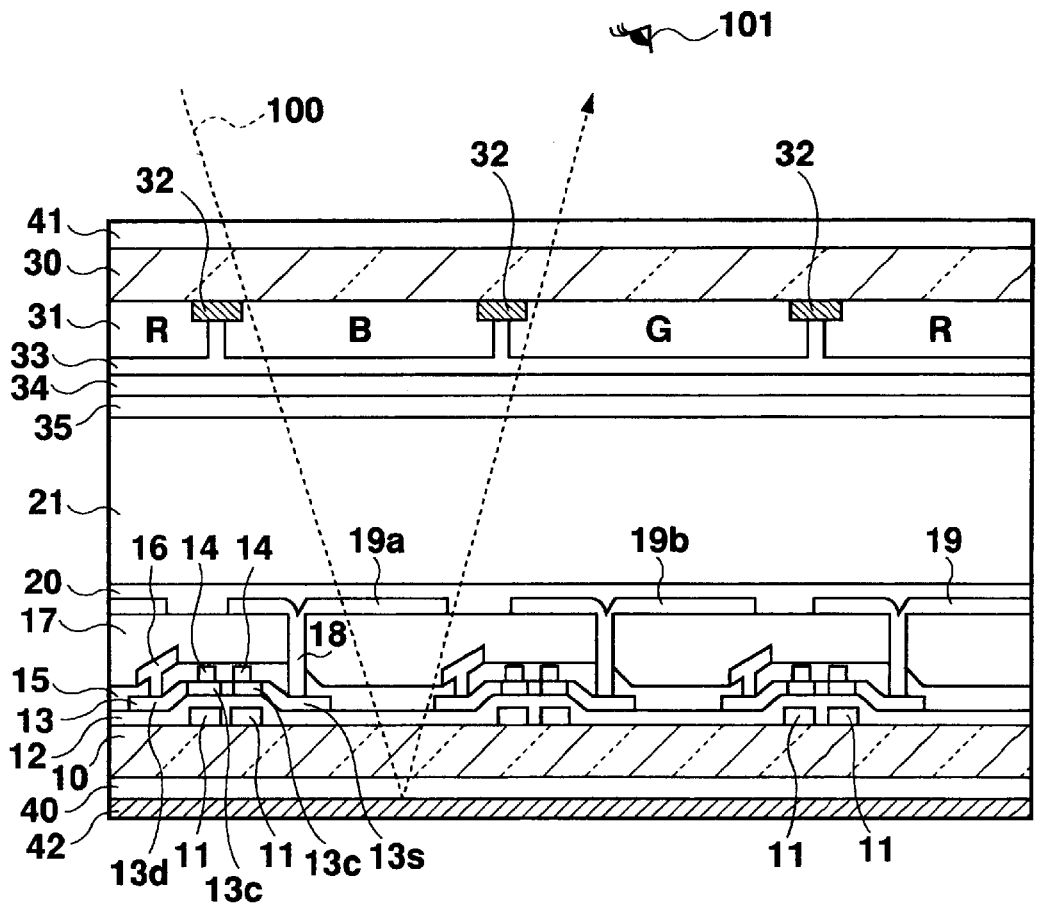
FIG. 1 is a sectional view of a conventional reflection type liquid crystal display.
Figure 2:
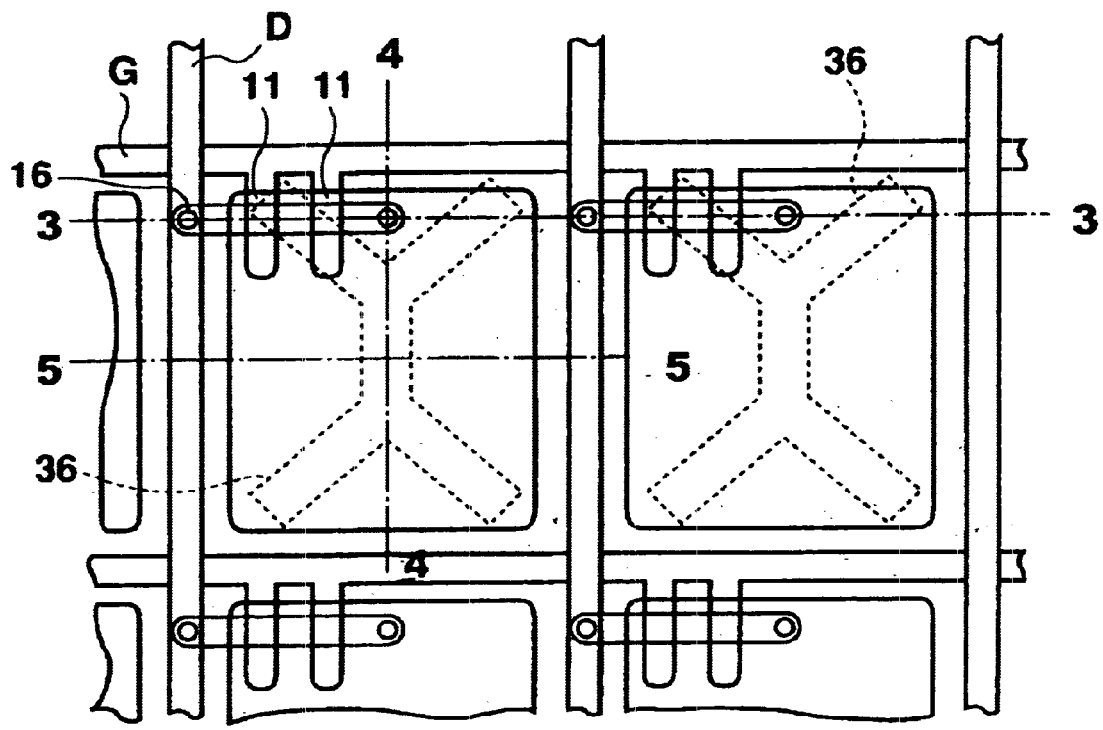
FIG. 2 is a plan view of a reflection type liquid crystal display according to the present invention.
Figure 3:
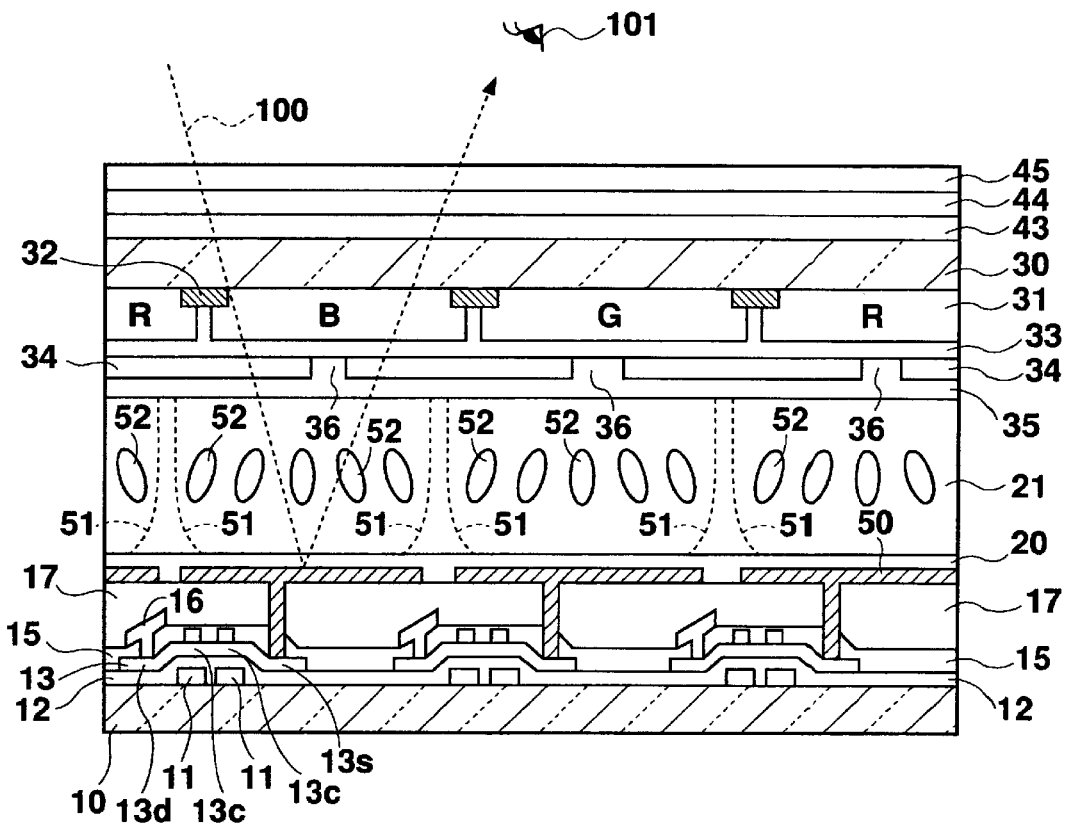
FIG. 3 is a sectional view of the reflection type liquid crystal display taken along the lines 3—3 and 5—5 in FIG. 2.

FIG. 2 is a plan view of the reflection type liquid crystal display according to the present invention, and FIG. 3 is a sectional view of the reflection type liquid crystal display taken along the line A—A in FIG. 2. That portion of the counter electrode substrate 30 which is shown in FIG. 3 is the section taken along the line C—C in FIG. 2.

As shown in FIG. 2, a thin film transistor (TFT) and a display electrode 50 are provided near an intersection between a gate signal line G integral with the gate electrodes 11 and a drain signal line D integral with the drain electrodes 16. The alignment control window 36 is provided on the counter electrode substrate 30.

In FIG. 3, the TFT substrate 10 forming a first substrate and the counter electrode substrate 30 forming a second substrate are transparent insulating substrates made of quartz glass, non-alkali glass or the like. From the gate electrodes 11 made of a refractory metal, such as Cr and Mo up to the planarization insulating film 17 on the TFT substrate 10 are formed with the same structure as with conventional display units.

In a display according to an embodiment of the present invention, reflective display electrodes 50 made of a conductive reflective material, such as Al or silver (Ag), and connected to the source electrodes 13s of the active layer 13 are formed on the planarization insulating film 17. The reflective display electrodes 50 are preferably made of a material with high reflectance. A vertical alignment film 20, which consists of polyimide or the like and aligns the liquid crystal molecules vertically (perpendicularly to the substrate), is formed on the reflective display electrodes 50. It is not necessary to perform a rubbing process on this vertical alignment film 20. Note that the polarizer and the reflector, which are conventionally attached, are not attached to the side of the insulating substrate 10 which do not face the liquid crystal, in other words, the external side of the panel.

On the other hand, the counter electrode substrate 30 is on its side facing the liquid crystal (the side facing the TFT substrate) provided with a color filter 31 comprising the primary colors R, G and B and a black matrix 32 with a function to shield light and a protective film 33 formed by a acrylic resin, for example, to protect the color filter 31. The protective film 33 is provided with a counter electrode 34, which faces the reflective display electrodes 50 and which have the alignment control windows 36 formed at positions corresponding to the reflective display electrodes 50. An alignment film 35 of polyimide is formed over the whole surface of the counter electrode 34.

On that side of the counter electrode substrate 30 which does not face the liquid crystal, in other words, on the viewing side of the display, a diffusing layer 43 to diffuse light, a phase ($\lambda/4$) plate 44 and a polarizer 45 are formed in succession. By the provision of the diffusing layer 43, light incident on the diffusing layer 43 is diffused in directions other than in the light incidence direction, so that a bright and uniform image can be obtained.

For the liquid crystal 21, a liquid crystal with a negative dielectric constant anisotropy is used. More specifically, a liquid crystal used should be such that the liquid crystal molecules are aligned perpendicularly with respect to the substrate when a voltage is applied and they are in parallel with the substrate when a voltage is not applied.

Description will be made of how light travels when one views above the reflection type liquid crystal display.

As shown by the broken line with an arrow in FIG. 3, natural light 100 is incident on the polarizer 45 on the side of an observer 101, and passes through the phase plate 44, the diffusing layer 43, the counter electrode substrate 30, the color filter 31, the protective film 33, the counter electrode 34, the alignment film 35, the liquid crystal 21, and the alignment film 20 on the TFT substrate 10. The light is reflected by the reflective display electrode 50, passes through the layers in a direction opposite to the direction of incidence, emerges from the polarizer 45 on the counter electrode substrate 30 and enters the eyes of the observer 101.

When a voltage is not applied across the liquid crystal, a light entering from outside is made a linearly polarized light by the polarizer 45, and the light is made a circularly polarized light by the phase plate 44 and is incident on the liquid crystal 21. The light is reflected by the reflective display electrode 50 with its phase changed by $\lambda/2$, and the light passes again through the liquid crystal 21 and has its phase changed by $\lambda/4$ by the phase plate 44, and is blocked by the polarizer 45 and appears to a viewer to be black.

When a voltage is applied across the liquid crystal, a light incident on the polarizer 45 becomes a linearly polarized light and emerges from the polarizer 45, and the light is made a circularly polarized light by the phase plate 44 and is incident on the liquid crystal 21. The light is reflected by the reflective display electrode 50 with its phase change by $\lambda/2$ and passes again through the liquid crystal 21. In passing through the liquid crystal, the light becomes an elliptic polarized light, has its phase changed by $\lambda/4$, is made a linearly polarized light by the polarizer 45, and appears to a viewer to be white light.

The insulating substrate 10 with TFTs fabricated as described and the counter substrate 30, which faces the insulating substrate 10 and which has the counter electrode 34 and the alignment film 35, are bonded together with their peripheries sealed by a sealing bond 23, thus forming a space inside. Once the space is filled with a liquid crystal 21, the LCD is complete.

The alignment control windows 36 and the alignment of the liquid crystal molecules will be described by referring to FIGS. 3, 4, and 5.

Figure 4:
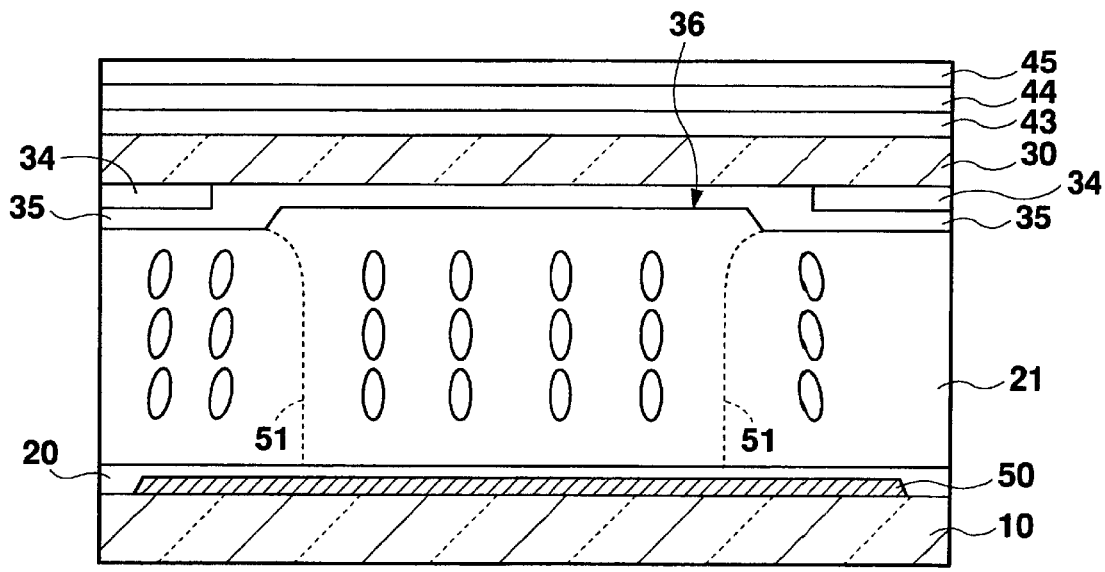
FIG. 4 is a sectional view of the reflection type liquid crystal display taken along the line 4—4 in FIG. 2.

FIG. 4 is a sectional view taken along the line B—B in FIG. 2 with some parts omitted. FIG. 5 is a sectional view taken along the line C—C in FIG. 2.

Figure 5:
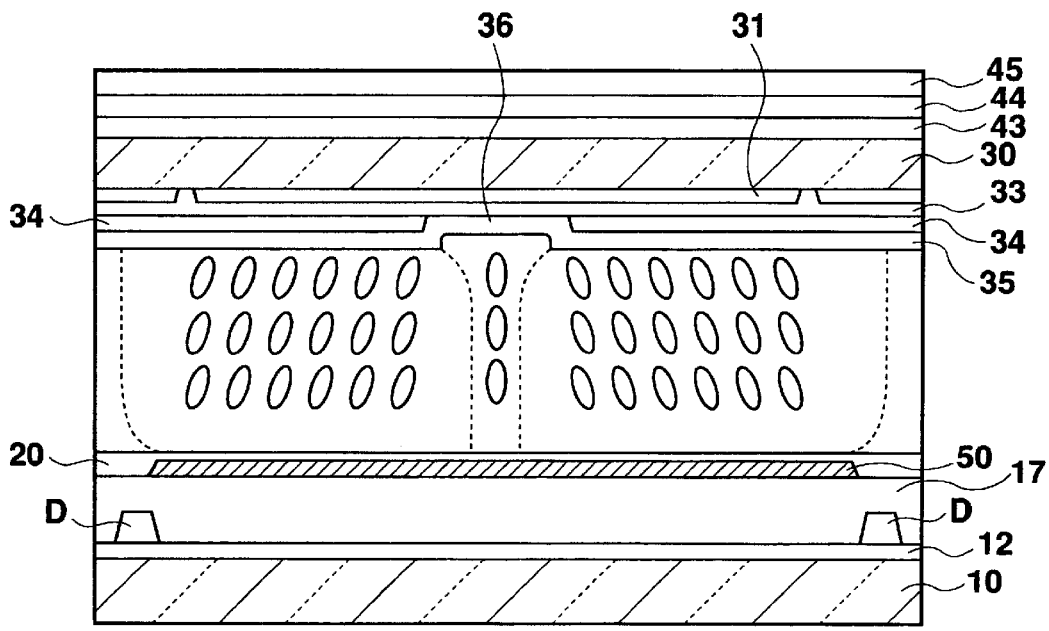
FIG. 5 is a sectional view of the reflection type liquid crystal display taken along the line 5—5 of FIG. 2.

As shown in FIGS. 3, 4, and 5, by an electric field 51 produced in such a way as to gradually widen toward the counter electrodes 34, the tilt angle of the liquid crystal molecules 52 from the direction of a normal to the substrate, which is dependent on the intensity of the electric field, is controlled and also the tilt direction is controlled and is made stable.

The tilt directions of the liquid crystal molecules differ in the four regions divided by the end portions of the reflective display electrodes 50 and the alignment control windows 36.

The liquid crystal molecules controlled differently in the respective regions of each reflective display electrode 50, and because of the continuum of the molecules, they tilt as if they are directed toward the center of the reflective display electrode 50. In other words, the effect of the provision of the alignment control windows 36 in the counter electrode 34 is that the liquid crystal molecules are aligned substantially without tilt in the area close to the center of the reflective, display electrode. Therefore, the major axes of the liquid crystal molecules are substantially parallel with the direction of a normal to a plane of the substrate. As one goes away from the center region, the alignment controlling force of the alignment control windows 36 over the liquid crystal molecules becomes weaker. In a location remote from the alignment control window 36, when a sufficient voltage is applied between the counter electrode 34 and the reflective display electrode 50, the liquid crystal molecules are aligned in parallel with the substrate.

As has been described, by providing the alignment control windows to control the alignment of the liquid crystal molecules with negative dielectric constant anisotropy, it becomes possible to achieve a wider viewing angle in any direction of the reflection type liquid crystal display.

Figure 6:
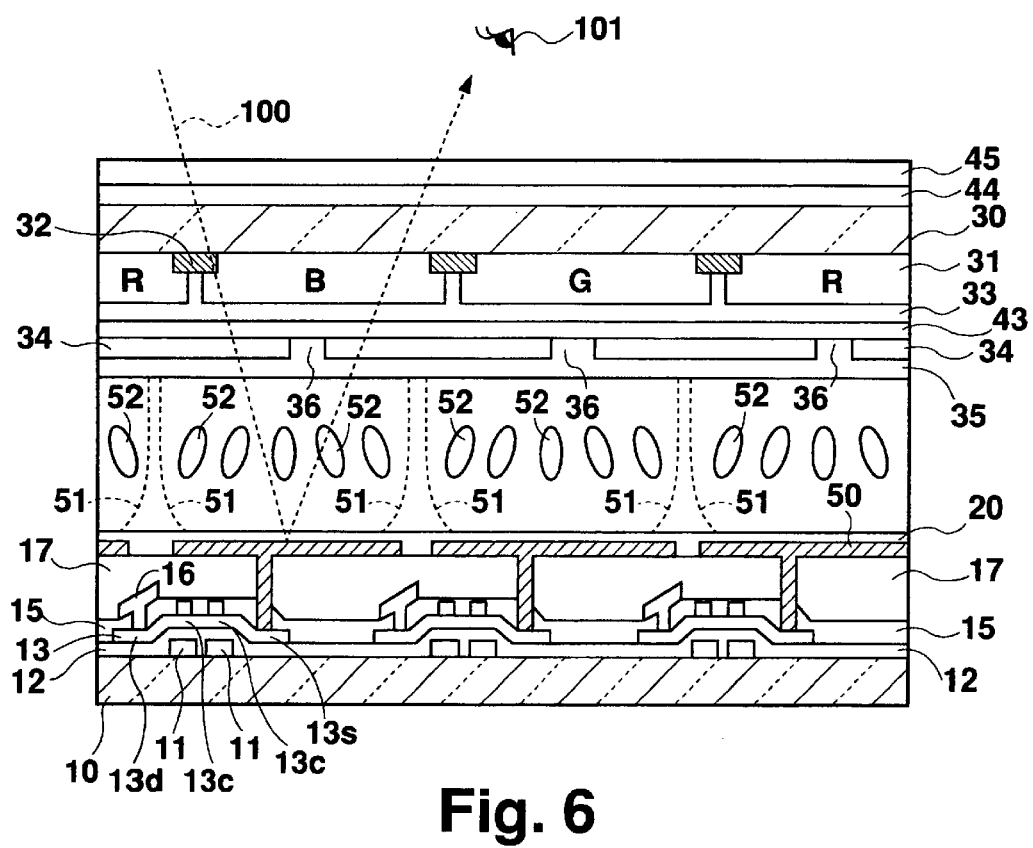
FIG. 6 is a sectional view of another embodiment of the reflection type liquid crystal display of the present invention.

In the above embodiment, the diffusing layer 43 is described as being provided on the side of the counter electrode substrate 30 which is opposite the side where the liquid crystal 21 is located, but the present invention is not limited to this structure. As shown in FIG. 6, the effect of the present invention can be obtained even if the diffusing layer 43 is located between the counter electrode 34 having the alignment control windows 36 in some portions thereof and the protective film 33 of the color filter 31.

What is claimed is:

1. A reflection type liquid crystal display comprising:
   first and second substrates disposed facing each other and holding therebetween liquid crystal molecules exhibiting a negative dielectric constant anisotropy;
   a switching element, a reflective display electrode formed of a conductive reflective material and connected to said switching element, and a first alignment film to align said liquid crystal molecules, disposed on a side of said first substrate facing said second substrate;
   a counter electrode having an alignment control window for controlling said alignment of said liquid crystal molecules and a second alignment film, disposed on a side of said second substrate facing said first substrate;
   a phase plate and a polarizer on a side of said second substrate not facing said first substrate; and
   a light diffusing layer provided on a side of said second substrate facing said first substrate.

2. A reflection type liquid crystal display according to claim 1, wherein said light diffusing layer is provided between said counter electrode and said second substrate.

3. A reflection type liquid crystal display according to claim 2, wherein color filters are provided at the side of said second substrate facing said first substrate, corresponding to said reflective display electrode, and said light diffusing layer is provided between said color filters and said counter electrode.

4. A reflection type liquid crystal display according to claim 3, further comprising a protective film disposed between said light diffusing layer and said color filters.

5. A reflection type liquid crystal display according to claim 1, wherein said alignment control window is formed at a position corresponding to said reflective display electrode.

6. A reflection type liquid crystal display according to claim 1, wherein said second alignment film is formed over a whole surface of said counter electrode.

7. A reflection type liquid crystal display according to claim 1, wherein the light diffusing layer is formed on a protective film formed on the side of said second substrate facing said first substrate and below the counter electrode.

8. A reflection type liquid crystal display comprising:
   first and second substrates disposed facing each other and holding liquid crystal molecules exhibiting a negative dielectric constant anisotropy therebetween;
   a switching element, a reflective display electrode formed of a conductive reflective material and connected to said switching element, and a first alignment film to align said liquid crystal molecules, disposed on a side of said first substrate facing said second substrate;
   a counter electrode having an alignment control window for controlling said alignment of said liquid crystal molecules and a second alignment film, disposed on a side of said second substrate facing said first substrate;
   a light diffusing layer provided on a side of said second substrate facing said first substrate; and
   a phase plate and a polarizer on a side of said second substrate not facing said first substrate, wherein the side of said second substrate not facing said first substrate is a viewing side of said display.

9. A reflection type liquid crystal display according to claim 8, wherein a light diffusing layer is formed on the side of said second substrate which faces or does not face said first substrate.

10. A reflection type liquid crystal display according to claim 9, wherein color filters are provided at the side of said second substrate facing said first substrate, corresponding to said reflective display electrode, and said light diffusing layer is provided between said color filters and said counter electrode.

11. A reflection type liquid crystal display according to claim 10, further comprising a protective film disposed between said light diffusing layer and said color filters.

12. A reflection type liquid crystal display according to claim 8, wherein said alignment control window is formed at a position corresponding to said reflective display electrode.

13. A reflection type liquid crystal display according to claim 8, wherein said second alignment film is formed over a whole surface of said counter electrode.

* * * * *